United States Patent [19]
Araki et al.

[11] Patent Number: 5,279,164
[45] Date of Patent: Jan. 18, 1994

[54] SEMICONDUCTOR PRESSURE SENSOR WITH IMPROVED TEMPERATURE COMPENSATION

[75] Inventors: Tohru Araki; Motomi Ichihashi, both of Itami, Japan

[73] Assignee: Mitsubishi Denki Kabushiki Kaisha, Tokyo, Japan

[21] Appl. No.: 903,925

[22] Filed: Jun. 26, 1992

Related U.S. Application Data

[63] Continuation-in-part of Ser. No. 709,840, Jun. 4, 1991, abandoned.

[30] Foreign Application Priority Data

Dec. 18, 1990 [JP] Japan .................. 2-411354

[51] Int. Cl.⁵ .................. G01L 9/06; G01L 19/04
[52] U.S. Cl. .................. 73/708; 73/721; 73/727; 73/756; 338/4
[58] Field of Search ........... 73/727, 708, 720, 721, 73/756, 754, DIG.; 338/4, 42; 29/621.1

[56] References Cited

U.S. PATENT DOCUMENTS

| | | | |
|---|---|---|---|
| 4,276,533 | 6/1981 | Tominaga et al. | 338/4 |
| 4,576,052 | 3/1986 | Sugiyama | 73/862.63 |
| 5,207,102 | 5/1993 | Takahashi et al. | 73/727 |
| 5,209,122 | 5/1993 | Matly et al. | 73/727 |

OTHER PUBLICATIONS

Zias et al, "Integration Brings a Generation of Low-Cost Transducers", Electronics, Dec. 1972, pp. 83-88.

*Primary Examiner*—Donald O. Woodiel
*Attorney, Agent, or Firm*—Leydig, Voit & Mayer

[57] ABSTRACT

A semiconductor pressure sensor includes a semiconductor pressure-sensing chip including a semiconductor body having a diaphragm that flexes in response to applied pressure, a strain gauge disposed in the diaphragm for altering an electrical signal in response to flexing of the diaphragm, and an amplifying circuit disposed in the semiconductor body outside the diaphragm and connected to the strain gauge for amplifying the electrical signal; a base supporting the semiconductor pressure-sensing chip; a package enclosing the semiconductor pressure-sensing chip and the base and having an opening providing access to the pressure-sensing chip; a plurality of leads penetrating the package and connected to the amplifying circuit; a substrate on which the package is mounted; and a gain-adjusting resistor disposed on the substrate opposite the package and electrically connected to the amplifying circuit for adjusting the gain of the amplifying circuit.

2 Claims, 4 Drawing Sheets

FIG. 1
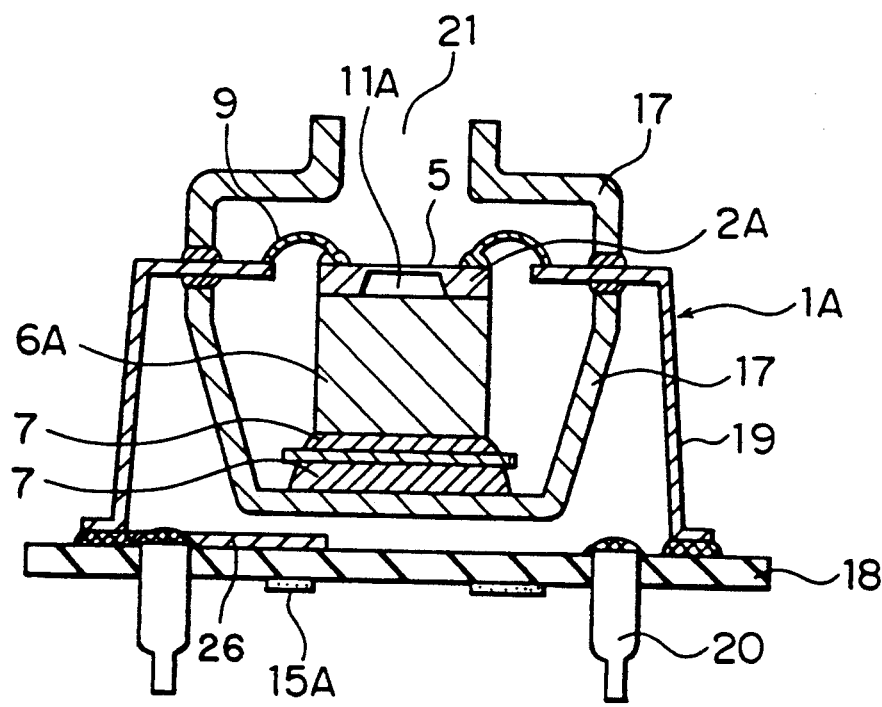
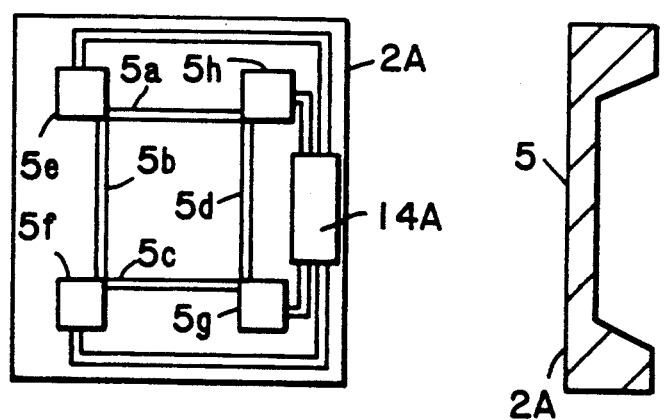
FIG.2(a)     FIG.2(b)

SEMICONDUCTOR PRESSURE SENSOR WITH IMPROVED TEMPERATURE COMPENSATION

This disclosure is a continuation in part of U.S. patent application Ser. No. 07/709,840, filed Jun. 4, 1991, now abandoned.

FIELD OF THE INVENTION

This invention relates to a semiconductor pressure sensor and, more particularly, to a small and relatively inexpensive semiconductor pressure sensor having improved temperature compensation.

BACKGROUND OF THE INVENTION

FIG. 5 is a cross-sectional view of a conventional semiconductor pressure sensor 1. The pressure sensor 1 includes a pressure-sensing chip 2 that responds to an applied pressure with an electrical signal or a change in an electrical signal. A cap 3 is joined to a stem 4 to enclose the pressure-sensing chip 2 in a package. The pressure-sensing chip 2 includes a diaphragm 5 that flexes in response to applied pressure. The pressure-sensing chip 2 is a unitary body of a semiconductor material, such as silicon, and the diaphragm 5 in the body is formed by etching and removing part of the body from one of its surfaces. The pressure-sensing chip 2 includes, at the unetched surface, four resistors formed in the chip by conventional means, such as doping or ion implantation. Those four resistors are connected in a conventional bridge circuit by conventional metallizations. When the diaphragm flexes in response to applied pressure, the resistances of the resistors change, resulting in a change in an electrical signal across the bridge circuit. That bridge circuit electrical signal is sensed to determine the pressure applied to the diaphragm 5.

In the structure of FIG. 5, the pressure-sensing chip 2 is mounted on a base 6 which, in turn, is adhered to the stem 4 with an adhesive 7. The base 6 includes a central opening in communication with a pressure-introducing tube 8 that is part of the stem 4. The opening in the base 6 is communication with the volume between the diaphragm 5 and the base 6. Connections to the bridge circuit are made by wires 9 that are connected to leads 10 that are mounted in and electrically insulated from the stem 4. Conventionally, the cap 3 is attached to the stem 4 with an airtight seal and a chamber 11 between the cap and stem is evacuated to form a zero pressure reference. In that arrangement, the pressure sensor measures the absolute pressure of the volume in communication with the tube 8. Alternatively, if the chamber 11 is in communication with the atmosphere, the pressure sensor measures gauge pressure.

The semiconductor pressure sensor of FIG. 5 produces a relatively weak electrical signal in response to ordinary pressures. Therefore, it is necessary to provide amplification to produce a usable electrical signal. In FIG. 6, an assembly including the pressure sensor 1 and signal amplification is shown in a perspective view. FIG. 7 is a bottom view of the same assembly that is shown in FIG. 6. In that assembly, the pressure sensor 1 is mounted on a supporting base 12 which, in turn, is mounted to a thick film substrate 13. The leads 10 from the sensor are connected to an integrated circuit 14 mounted on the reverse surface of the substrate 13 by conductors 22 disposed on the rear surface of the substrate 13. The integrated circuit 14 amplifies the electrical signal produced by the sensor. Resistors, including a resistor 15, are disposed on the front surface of the substrate 13 for controlling the electrical characteristics of the assembly. The integrated circuit 14 is connected through the substrate 13 to the resistor network on the front surface of the substrate. Clip leads 16 connected to the resistor network and, thereby, to the integrated circuit 14 of the sensor 1 are disposed at edges of the substrate 13 for mounting and connection of the assembly to other circuitry.

In operation, the pressure to be sensed is supplied to the sensing chip 2 through the tube 8. In response to the pressure, the diaphragm 5 flexes so that the resistors formed in the diaphragm 5 are subjected to various compressive and tensile forces, changing their resistances. The electrical signal across the bridge circuit is indicative of those resistances and, therefore, the applied pressure. That signal is amplified by the integrated circuit 14 to produce a final output signal.

The conventional pressure sensor 1 employs a relatively large number of parts and, therefore, must be relatively large. In addition, the only temperature compensation, i.e., correction of the final output signal for changes in the temperature of the sensor 1, is provided in the assembly of FIGS. 6 and 7 by the integrated circuit 14. That integrated circuit 14 is mounted on the thick film substrate 13 at a distance from the pressure sensor 1 and the pressure-sensing chip 2. Because of this separation, the temperature of the integrated circuit 14 may be significantly different from the temperature of the pressure-sensing chip 2, resulting in inaccurate temperature compensation.

SUMMARY OF THE INVENTION

An object of the invention is to provide a relatively small semiconductor pressure sensor employing a relatively small number of parts.

Another object of the invention is to provide a semiconductor pressure sensor having improved temperature compensation.

In order to achieve the foregoing objects, according to one aspect of the invention, a semiconductor pressure sensor comprises a semiconductor pressure-sensing chip including a diaphragm that flexes in response to applied pressure, a strain gauge disposed in the diaphragm for changing an electrical signal in response to flexing of the diaphragm, and an amplifying circuit disposed in the pressure-sensing chip outside the diaphragm for amplifying the electrical signal; a base supporting the pressure-sensing chip; a package enclosing the pressure-sensing chip and the base and having an opening providing access to the pressure-sensing chip; and a plurality of leads penetrating the package and connected to the amplifying circuit.

According to a further aspect of the invention, the semiconductor pressure sensor package is mounted on a substrate and a gain-adjusting resistor is disposed on the substrate and electrically connected to the amplifying circuit for adjusting the gain of the amplifying circuit. The gain-adjusting resistor may be changed in resistance by altering its size, for example, by laser-trimming.

In the invention, the amplifying circuit is part of the pressure-sensing chip so it is at the same temperature as the pressure-sensing chip. Thereby, the accuracy of the temperature compensation of the pressure sensor is improved so that the applied pressure is measured with improved accuracy, independent of temperature changes.

Other objects and advantages of the present invention will become apparent from the detailed description given hereinafter. The detailed description and specific embodiments are provided for illustration only, since various additions and modifications within the spirit and scope of the invention will become apparent to those of skill in the art from the detailed description.

BRIEF DESCRIPTION OF THE DRAWINGS

FIG. 1 is a cross-sectional view of an embodiment of a semiconductor pressure sensor according to the present invention;

FIGS. 2(a) and 2(b) are top and sectional side views, respectively, of a pressure-sensing chip employed in an embodiment of the invention;

DETAILED DESCRIPTION OF PREFERRED EMBODIMENTS

FIG. 1 is a schematic cross-sectional view of an embodiment of a semiconductor pressure sensor 1A according to the present invention. In FIG. 1 and all other figures, the same reference numbers designate or corresponding elements. The semiconductor pressure sensor 1A includes a pressure-sensing chip 2A made of a unitary body of a semiconductor material, such as silicon. The pressure-sensing chip 2A includes a diaphragm 5 that flexes in response to pressure applied to it. The pressure-sensing chip 2A is shown in plan and side sectional views in FIGS. 2(a) and 2(b), respectively. Four resistors 5a-5d are disposed within the area of the diaphragm 5 on the chip 2A. Those resistors are formed in the silicon body and change resistance in response to compressive and tensile stresses applied to the resistors. Each of the resistors is connected to two of the wiring pads 5e-5h and are thereby connected in a bridge circuit similar to the prior art strain gauge bridge circuit. The resistors and wiring pads can be formed by using conventional semiconductor technology techniques, such as the diffusion of impurities or the ion implantation of impurities into the semiconductor body, metallizations, and photolithography. The respective wiring pads 5e-5h are electrically connected to an amplifying circuit 14A, an integrated circuit that is formed in the semiconductor body of the chip 2A. The amplifying circuit 14A is disposed outside the diaphragm 5 of the semiconductor body forming the chip 2A so that the circuit is not subjected to significant stresses when the diaphragm flexes.

Figure 3:
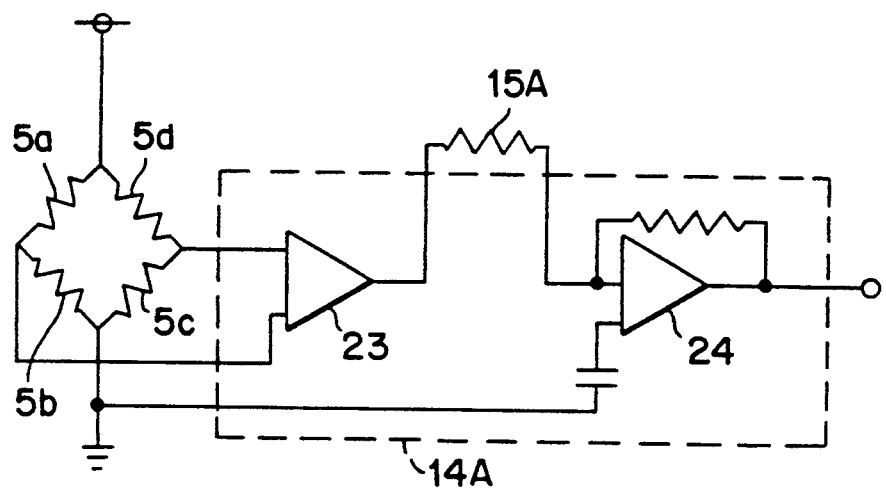
FIG. 3 is schematic diagram of a strain gauge and amplifying circuit employed in an embodiment of the invention.

An example of the circuitry employed in the integrated circuit 14A is shown in FIG. 3. The resistors 5a-5d are connected in a bridge circuit. Two opposed nodes of the bridge are connected respectively to a voltage source and to ground. The other two opposed nodes of the bridge circuit are connected to a first operational amplifier 23 which amplifies the electrical signal across those nodes to produce an output signal. A second operational amplifier 24 receives the output signal of the first operational amplifier 23 through an adjusting resistor 15A. The second operational amplifier 24 produces a final output signal. The overall gain of the two amplifiers is controlled by the value of the resistor 15A coupling the first amplifier 23 to the second amplifier 24. As indicated in FIG. 3, the elements shown within the broken line are part of the integrated circuit 14A and are disposed on the chip 2A. The gain-adjusting resistor 15A is disposed on a separate substrate, as described below.

In the pressure sensor 1A of FIG. 1, the pressure-sensing chip 2A is mounted on the base 6A, forming a closed chamber 11A between the diaphragm 5 and the base 6A that is evacuated and provides a zero pressure reference. Leads 9 connect the amplifying circuit 14A to respective leads 19 that penetrate a package 17. The leads 19 are mounted on a substrate 18, for example, by soldering, to respective parts of a wiring pattern on the insulating substrate 18. The connections of the wires 9 to the amplifying circuit 14A are omitted from FIG. 2(a) for clarity. As illustrated in FIG. 1, the gain-adjusting resistor 15A is located on the reverse side of the insulating substrate 18 from the package 17 and is connected by metallization 26 to leads 19 and thereby to the first and second operational amplifiers 23 and 24 of the circuitry, as shown in FIG. 3. Clip leads 20 extend from the insulating substrate 18 for mounting the pressure sensor in an assembly. The package 17 includes an opening 21 for the introduction of the pressure that is sensed by the chip 2A.

Figure 4:
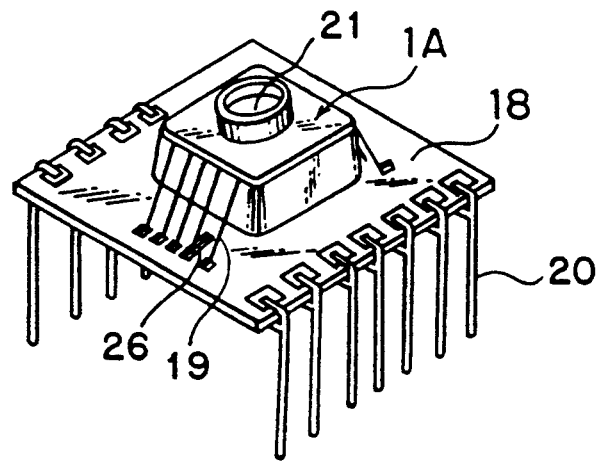
FIG. 4 is a perspective view of an assembly including the pressure sensor of FIG. 1.
Figure 5:
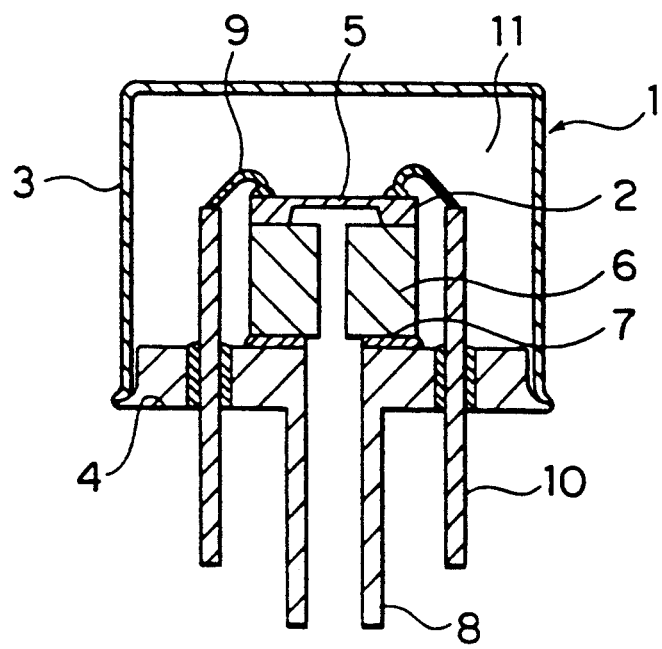
FIG. 5 is a cross-sectional view of a conventional semiconductor pressure sensor.
Figure 6:
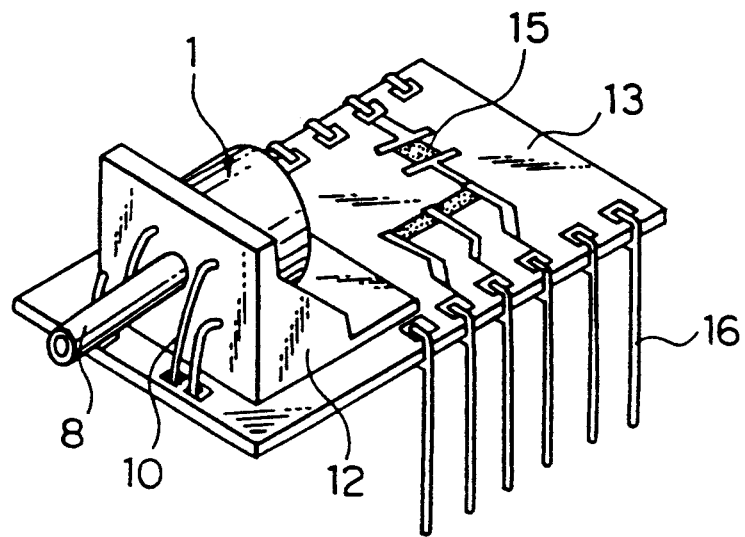
FIG. 6 is a perspective view of an assembly employing the pressure sensor of FIG. 5.
Figure 7:
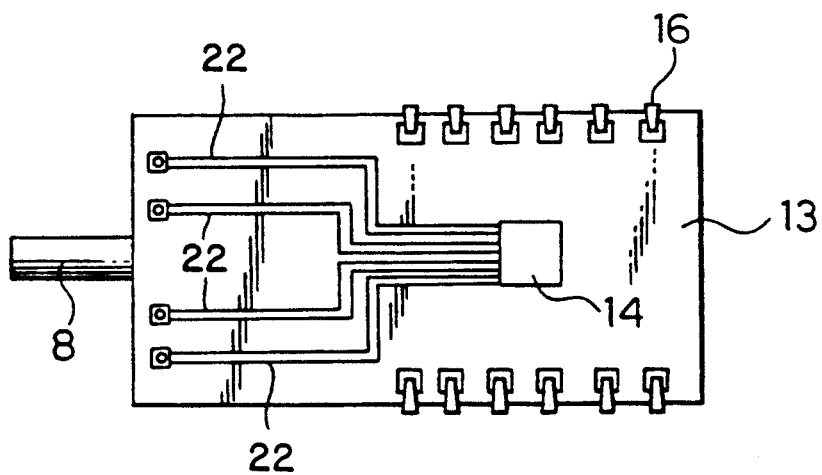
FIG. 7 is a bottom view of the pressure sensor assembly of FIG. 6.

An assembly including the pressure sensor 1A is shown in a perspective view in FIG. 4. The elements shown in that figure have previously been described with respect to FIG. 1. The gain-adjusting resistor 15A is not visible in FIG. 4 but, because of its mounting on the reverse side of the insulating substrate 18, its resistance can easily be adjusted by removing part of the resistor. The material may be removed from the resistor with a laser beam or other energy beam that is incident on a selected region of the resistor, changing the resistance. Altering the resistance of the resistor 15A permits a desired overall gain for the amplifying circuit 14A to be obtained regardless of variations in other amplifying and bridge circuit parameters. Since, in the invention, the amplifying circuit 14A is disposed directly on the pressure-sensing chip 2A, it is always at essentially the same temperature as the strain gauge resistors 5a-5d. Thereby, improved and highly accurate temperature compensation is provided. Moreover, the use of an external integrated circuit, like integrated circuit 14 of FIG. 7, is avoided, reducing the number of parts in the sensor assembly. The reduction in the number of parts employed reduces the complexity of the assembly and enables it to be reduced in size.

When a pressure to be sensed is applied to the sensor through the opening 21 of the package 17, the diaphragm 5 of the pressure sensing chip flexes, stressing the resistors 5a-5d so that the bridge circuit signal, amplified by circuit 14A, provides an indication of the pressure applied. Ambient temperature changes equally affect the strain gauge resistors and the amplifying circuit 14A, providing highly accurate temperature compensation, i.e., an accurate measure of the applied pressure independent of the sensor temperature.

We claim:

1. A semiconductor pressure sensor comprising:

a semiconductor pressure-sensing chip including a semiconductor body having a diaphragm that flexes in response to applied pressure, a strain gauge disposed in the diaphragm for altering an electrical signal in response to flexing of the diaphragm, and an amplifying circuit disposed in the semiconductor body outside the diaphragm and connected to the strain gauge having a gain for amplifying the electrical signal;

a base supporting the semiconductor pressure-sensing chip;

a package enclosing the semiconductor pressure-sensing chip and the base and having an opening providing accessess to the pressure-sensing chip;

a plurality of leads penetrating the package and connected to the amplifying circuit;

a substrate on which the package is mounted; and a gain-adjusting resistor disposed on the substrate opposite the package and electrically connected to the amplifying circuit for adjusting the gain of the amplifying circuit.

2. The semiconductor pressure sensor of claim 1 wherein the package is mounted on the substrate with the leads.